(12) United States Patent
O'Neill (10) Patent No.: US 8,938,869 B2
(45) Date of Patent: Jan. 27, 2015

(54) AUTOMATIC UNIVERSAL JOINT ASSEMBLY METHOD AND APPARATUS

(71) Applicant: Robert W. O'Neill, Elkhorn, WI (US)

(72) Inventor: Robert W. O'Neill, Elkhorn, WI (US)

( * ) Notice: Subject to any disclaimer, the term of this patent is extended or adjusted under 35 U.S.C. 154(b) by 144 days.

(21) Appl. No.: 13/777,189

(22) Filed: Feb. 26, 2013

(65) Prior Publication Data

US 2013/0219688 A1  Aug. 29, 2013

Related U.S. Application Data

(60) Provisional application No. 61/604,077, filed on Feb. 28, 2012.

(51) Int. Cl.
*B23P 19/02* (2006.01)
*B25B 27/02* (2006.01)
*F16D 3/40* (2006.01)
*F16D 3/41* (2006.01)

(52) U.S. Cl.
CPC ............... *B25B 27/02* (2013.01); *F16D 3/405* (2013.01); *F16D 3/41* (2013.01)
USPC .................. 29/235; 29/453; 29/464; 29/466; 29/468

(58) Field of Classification Search
USPC ........ 29/453, 464, 466, 468, 235, 434, 281.1, 29/281.4, 446, 244, 251
See application file for complete search history.

(56) References Cited

U.S. PATENT DOCUMENTS

| 4,558,502 | A |   | 12/1985 | Gossmann et al. |
| 5,062,327 | A |   | 11/1991 | Hammons et al. |
| 5,794,341 | A | * | 8/1998 | Carlini ..................... 29/898.061 |
| 5,797,800 | A |   | 8/1998 | Rhoades et al. |
| 5,802,705 | A | * | 9/1998 | Carlini ........................... 29/724 |
| 5,836,078 | A | * | 11/1998 | Aiken et al. ............... 29/898.07 |
| 6,162,126 | A |   | 12/2000 | Barrett et al. |

* cited by examiner

*Primary Examiner* — Ryan J Walters
(74) *Attorney, Agent, or Firm* — Jansson Munger McKinley & Shape Ltd.

(57) ABSTRACT

Apparatus for automatic assembly of universal joints which include a yoke with snap ring grooves in its yoke arms, a trunnion body, bearings, and snap rings to secure the bearings in the yoke, the apparatus comprising: (a) upper and lower parallel spring-separated plate pairs with axially-aligned holes; (b) upper and lower drive members aligned with holes in each plate pair; (c) a base plate; (d) a movable rod plate; (e) upper and lower power sources configured to provide axial movement of an upper driver plate in the upper plate pair and the rod plate, respectively; and (f) a programmed controller controlling the power sources such that automatic sequencing of the upper driver plate and rod plate sequentially urge snap rings into place in grooves within the snap ring grooves.

13 Claims, 8 Drawing Sheets

AUTOMATIC UNIVERSAL JOINT ASSEMBLY METHOD AND APPARATUS

RELATED APPLICATION

This application claims the benefit of U.S. Provisional Application Ser. No. 61/604,077, filed Feb. 28, 2012. U.S. Provisional Patent Application Ser. No. 61/604,077 is incorporated herein by reference in its entirety to provide continuity of disclosure.

FIELD OF THE INVENTION

The present invention is generally related to the field of automated mechanical assembly and more particularly to methods and apparatus for the automated assembly of universal joints.

BACKGROUND OF THE INVENTION

Universal joints are common mechanical components in many products such as vehicles of all types and many other products which include the transmission of rotational mechanical power. The process of assembling the components of such universal joints is typically a manually-intensive procedure. As such, the procedure can be complex, time-consuming, difficult to maintain quality, and oftentimes can create unsafe production environments for the assembly personnel. There is therefore a need for a simpler, faster, more repeatable and safer method by which to assemble such mechanical components.

In the past, there have been some approaches to addressing these needs. U.S. Pat. No. 4,558,502 (Gossman et al.), entitled "Process and Apparatus for Assembling Universal Joints," discloses a method and the accompanying apparatus for individually assembling a trunnion and its bearing cup in its corresponding yoke arm. Each yoke arm is pretensioned as part of the process disclosed.

Notwithstanding some efforts in improvement of assembly methods and related equipment, there remains a need for an accurate, high-speed and safe assembly method and related apparatus for that purpose.

OBJECTS OF THE INVENTION

It is an object of the automatic universal joint assembly method and apparatus is to speed up the assembly of universal joints.

Another object of the automatic universal joint assembly method and apparatus is to improve the repeatability and quality of the assembly of universal joints.

Yet another object of the automatic universal joint assembly method and apparatus is to improve the safety of the process of assembling universal joints.

Still another object of the automatic universal joint assembly method and apparatus is to lower the complexity of the process of assembling universal joints.

These and other objects of the invention will be apparent from the following descriptions and from the drawings.

SUMMARY OF THE INVENTION

The present invention is apparatus for automatic assembly of universal joints which include a yoke with snap ring grooves in its yoke arms, a trunnion body, bearings, and snap rings to secure the bearings in the yoke. The apparatus comprises: (a) an upper parallel plate pair, including an uppermost driver plate having an upper drive member, an upper tapered-hole plate defining a tapered hole axially aligned with the upper drive member and having its narrow end away from the upper driver plate, and at least one spring between the plates of the upper pair; (2) a lower parallel plate pair, including a lowermost driver plate having a lower drive member, a lower tapered-hole plate defining a tapered hole axially aligned with the upper and lower drive members and having its narrow end away from the lower driver plate, and at least one spring between the plates of the lower pair; (3) a base plate on which the lower driver plate is mounted and a movable rod plate therebelow having driver rods extending through corresponding holes in the lower driver plate; (4) upper and lower power sources configured to provide axial movement of the upper driver plate and the rod plate, respectively; and (5) a programmed controller controlling the power sources.

In certain embodiments of the inventive apparatus, the tapered holes have a taper of between 4° and 6°.

In some preferred embodiments, the controller is a programmable logic controller.

In other preferred embodiments, at least one of the drive members is magnetic, and in some of these embodiments, the magnetic drive member includes a magnet.

In other preferred embodiments of the inventive apparatus, the spring(s) of the lower plate pair have a lower stiffness than the spring(s) of the upper plate pair.

The present invention also includes a method for automatic assembly of universal joints which include a yoke with snap ring grooves in its yoke arms, a trunnion body, bearings, and snap rings to secure the bearings in the yoke. The steps of the inventive method comprise: (1) providing an upper parallel plate pair, including an uppermost driver plate having an upper drive member, an upper tapered-hole plate defining a tapered hole axially aligned with the upper drive member and having its narrow end away from the upper driver plate, and at least one spring between the plates of the upper pair; (2) providing a lower parallel plate pair, including a lowermost driver plate having a lower drive member, a lower tapered-hole plate defining a tapered hole axially aligned with the upper and lower drive members and having its narrow end away from the lower driver plate, and at least one spring between the plates of the lower pair, such spring(s) having a lower stiffness than the spring(s) of the upper plate pair; (3) providing a base plate on which the lower driver plate is mounted and a movable rod plate therebelow having driver rods extending through corresponding holes in the lower driver plate; (4) providing upper and lower power sources configured to provide axial movement of the upper driver plate and the rod plate, respectively; (5) providing a programmed controller controlling the power sources; (6) positioning the distal ends of the upper and lower drive members at the wide ends of the upper and lower tapered holes, respectively; (7) placing one of the snap rings in each of the two tapered holes and thereafter placing one of the bearings in each of such tapered holes; (8) placing the yoke and trunnion body such that the trunnions are in alignment with the tapered holes; and (9) automatically sequencing movements of the upper driver plate and the rod plate to sequentially urge each of the snap rings through its corresponding narrowing tapered hole such that the snap ring moves into position for expansion into the corresponding groove.

DETAILED DESCRIPTION OF PREFERRED EMBODIMENTS

Figure 1:
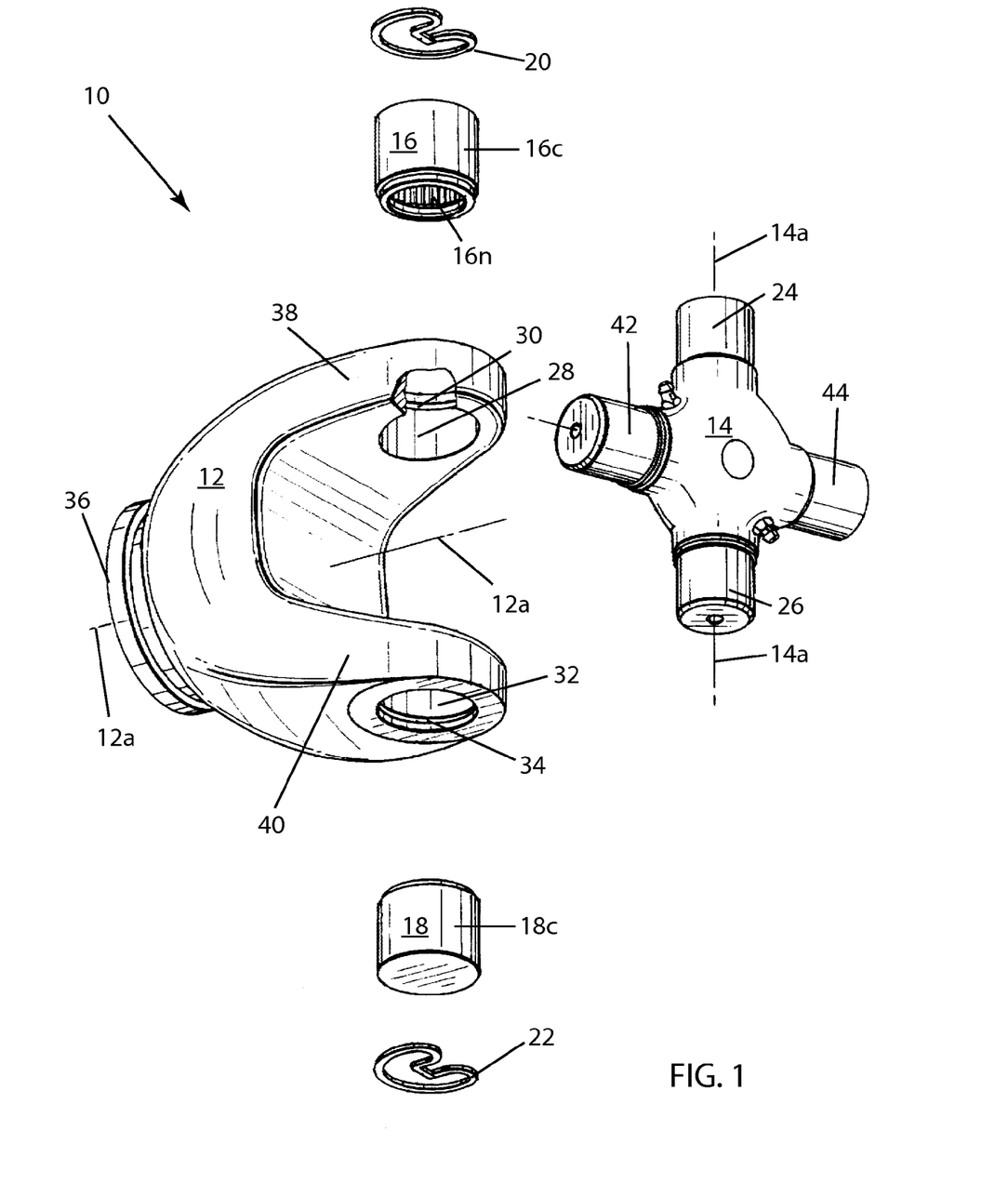
FIG. 1 is an exploded view perspective drawing of one type of universal joint assembly which is assembled by the inventive method and apparatus of this invention.
Figure 2A:
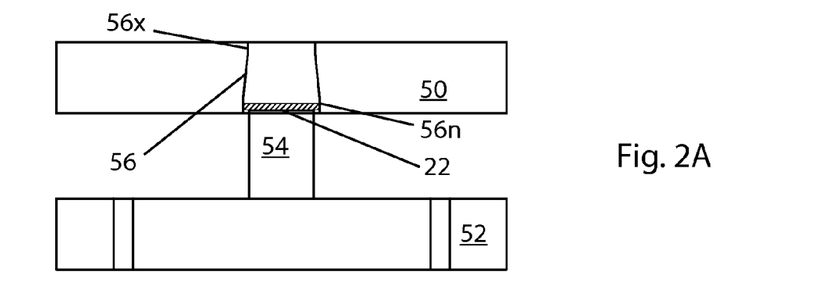
FIGS. 2A-2D are sequential schematic drawings illustrating the steps of the snap ring insertion process of the inventive assembly method and apparatus.
Figure 2B:
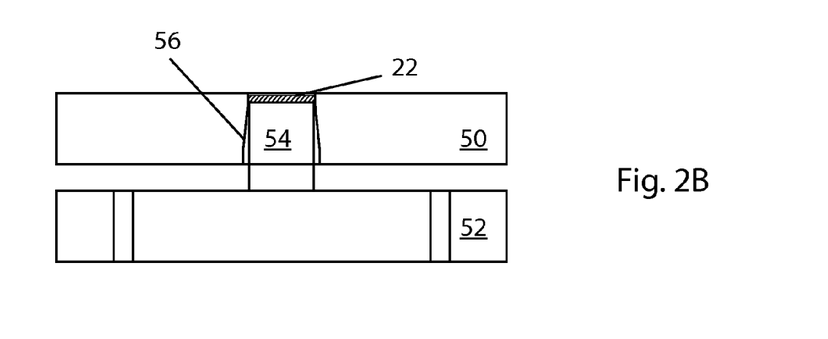
Figure 2C:
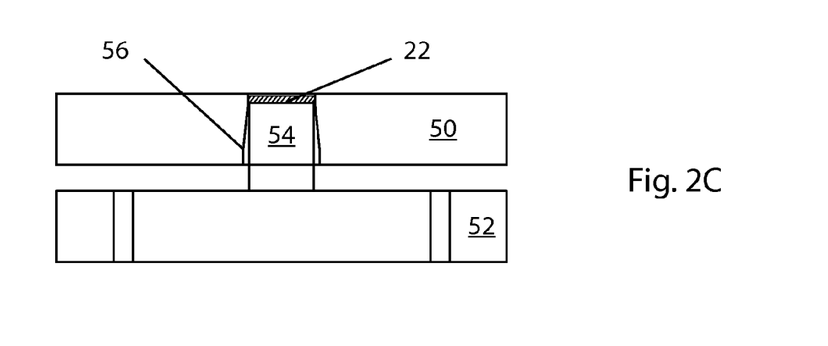
Figure 2D:
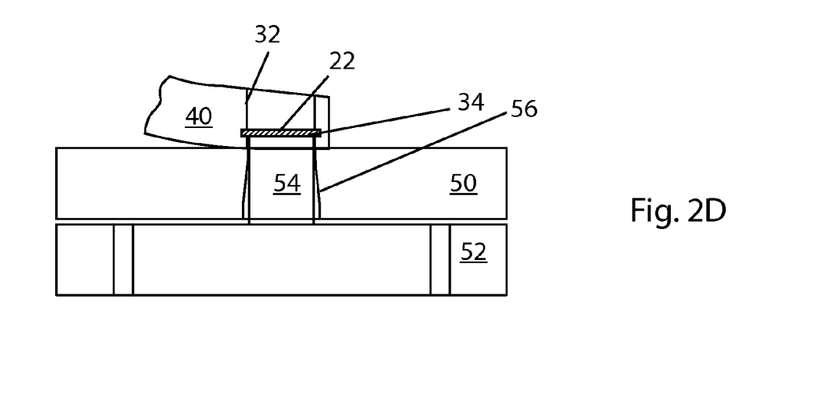

FIG. 1 illustrates a portion of one type of universal joint assembly 10, hereinafter referred to as U-joint 10. U-joint 10 includes a yoke body 12 which is connected to a shaft such as a drive shaft, not shown but connected to yoke body 12 with a connector 36, and is aligned therein with a yoke body axis 12a. U-joint 10 also includes a trunnion body 14 with four cylindrical trunnions: a first trunnion 24 and a second trunnion 26 each aligned with a first trunnion axis 14a and a third trunnion 42 and a fourth trunnion 44 each aligned with a second trunnion axis 14b which is perpendicular to and coplanar with axis 14a.

Yoke body 12 of U-joint 10 includes a first yoke arm 38 and a second yoke arm 40. First yoke arm 38 is also herein referred to as upper arm 38 and second yoke arm 40 is also herein referred to as lower arm 40. In similar fashion, first trunnion 24 and second trunnion 26 are also herein referred to as upper trunnion 24 and lower trunnion 26, respectively. The use of "upper" and "lower" as such descriptors is not intended to limit the orientation of such elements but is used herein as a convenience in describing the assembly of U-joint 10 when referring to the elements of FIG. 1 and other figures accordingly.

Upper and lower arms 38 and 40 include a pair of openings 28 and 32, respectively. Openings 28 and 32 are configured to receive a pair of needle bearings 16 and 18, respectively. Needle bearing 16 includes bearing cup 16c and needles 16n, and needle bearing 18 includes bearing cup 18c and needles (not shown).

In assembled form, upper trunnion 24 is surrounded by needle bearing 16 which is held within opening 28, and in similar fashion, lower trunnion 26 is surrounded by needle bearing 18 which is held within opening 32. Needle 16n of bearing 16 bear on the outer surface of upper trunnion 24, and the needles of needle bearing 18 bear on the outer surface of trunnion 26. Bearing cups 16c and 18c are retained in openings 28 and 32, respectively, by a pair of snap rings 20 and 22. Snap rings 20 and 22 are seated within a pair of grooves 30 and 34 in openings 28 and 32, respectively.

U-joint 10 provides low-friction rotation of trunnion body 14 with respect to yoke body 12 around axis 14a. In a similar fashion but not shown in FIG. 1, third and fourth trunnions may be installed in a second yoke body to provide for rotation of trunnion body 14 with respect to such second yoke body around axis 14b. The elements to provide such relative movement may be similar to the elements shown in FIG. 1. Such a U-joint configuration is well-known and is used provide a flexible connection between a driveshaft connected to yoke body 12 and a second shaft similarly connected to the second yoke body, thereby transmitting rotational mechanical power between the two shafts.

FIGS. 2A-2D show the steps of the snap ring insertion process of the inventive assembly method and apparatus. As described above, the U-joints being assembled by the inventive method and apparatus have snap rings 20 and 22 in each of the two yoke arms 38 and 40, respectively. The means by which snap rings 20 and 22 are automatically inserted includes the use of two pairs of plates, including upper pair 102 and 104 and lower pair 114 and 116. See FIGS. 3A-3F. FIGS. 2A-2D illustrate the insertion process by means of a pair of plates 50 and 52 to represent both upper and lower pairs later shown in FIGS. 3A-3F.

Referring to FIGS. 2A-2D, tapered-hole plate 50 defines a tapered hole 56 configured to receive snap ring 22 manually. At the beginning of the assembly process, snap ring 22 is supported on driver 54 which is mounted on driver plate 52. During the automatic insertion process, driver 54 drives snap ring 22 into tapered hole 56 and the taper serves to laterally compress snap ring 22 as it approaches the narrow end of tapered hole 56, at which point snap ring 22 is compressed to a width sufficient to allow snap ring 22 to slide into opening 32 of yoke arm 40 and subsequently into groove 34 of yoke arm 40.

The insertion of snap ring 20 occurs in a similar fashion to the insertion of snap ring 22 illustrated in FIGS. 2A-2D.

The taper of tapered hole 56 is preferably between 4° and 6°. Tapered hole 56 may include an entrance straight section 56n and an exit straight section 56x. Tapered hole 56 in FIGS. 2A-3F all have such straight sections.

FIGS. 3A-3F schematically illustrate the apparatus and the steps of the automated assembly method of this invention. Note that each of these schematics may have portions of the illustration done in "transparent" cross-section in order to be able to see the relative positions of each of the components of the apparatus and the U-joint being assembled.

Apparatus 100 includes a pair of upper plates (upper driver plate 102 and upper tapered-hole plate 104) and a pair of generally similar lower plates (lower driver plate 116 and lower tapered-hold plate 114). Lower driver plate 116 is stationary on base plate 124 and is indicated as stationary with dotted line 126.

Upper plates 102 and 104 have springs 108 therebetween (two shown). Upper driver plate 102 includes driver 106 which is a cylindrical member sized to pass through the narrow end of tapered hole 112 and into opening 28 of yoke 12. Likewise, lower plates 116 and 114 have springs 120 therebetween (two shown). Lower driver plate 116 includes driver 118 which is a cylindrical member sized to pass through the narrow end of tapered hole 123 and into opening 32 of yoke 12.

Lower driver plate 116 and base plate 124 include holes 132 through which driver rods 130 (two shown) may be driven to engage lower tapered hole plate 114. Rods 130 are mounted on rod plate 128 which is driven by power source 122 (not shown in any detail). Upper driver plate 102 is similarly driven by power source 110 (also not shown in any detail). Power sources 110 and 122 may be hydraulic, pneumatic or electrically driven to provide linear motion and are programmably controlled by a controller (not shown) such as a PLC (programmable logic controller) or other logic controller such as, but not limited to, a fluidic controller or a computer. The controller may include one or more limit switches which serve to indicate when the distance between a pair of plates has reached a predetermined value. Such use of limit switches, not shown in the figures, is well-known to those skilled in the art of controllers for mechanical systems.

Figure 3A:
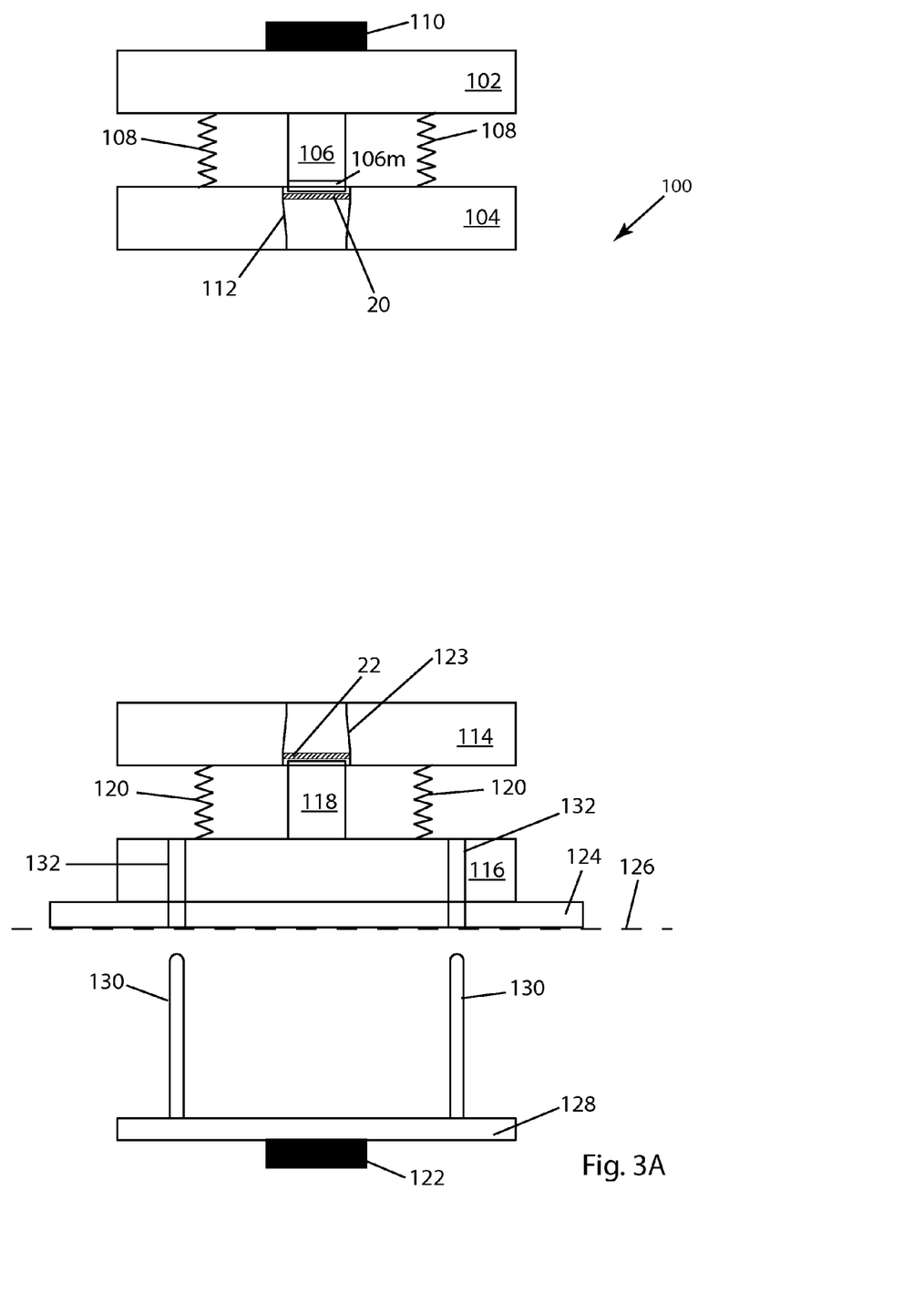
FIG. 3A is a cross-sectional schematic drawing illustrating the step of manually loading the snap rings into the inventive apparatus.
Figure 3B:
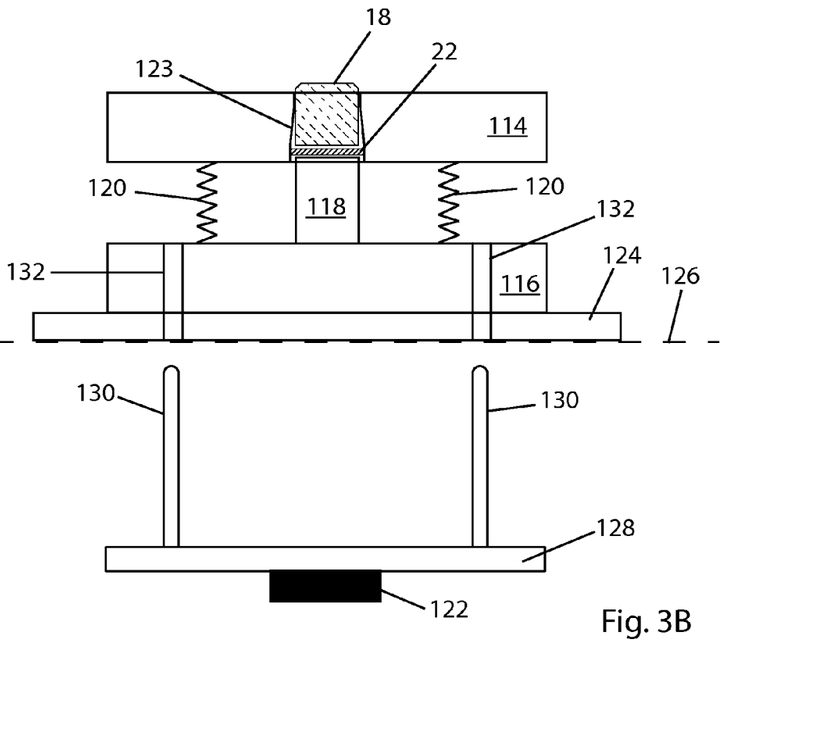
FIG. 3B is a cross-sectional schematic drawing illustrating the step of manually loading the needle bearings into the inventive apparatus.
Figure 3C:
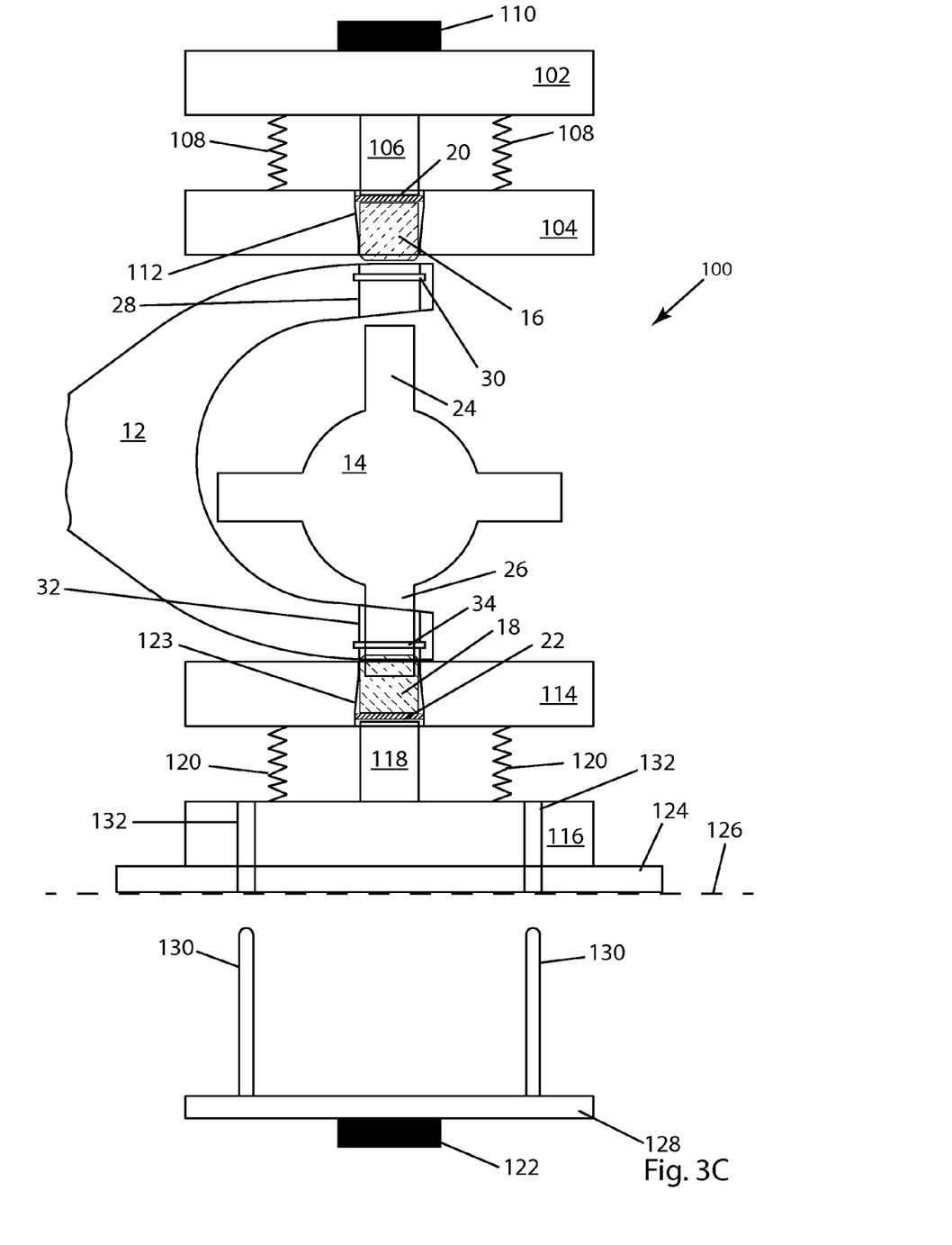
FIG. 3C is a cross-sectional schematic drawing illustrating the step of manually placing the universal joint yoke and trunnion body the inventive apparatus.

FIGS. 3A-3C illustrate the manual set-up steps prior to the automated steps of the inventive assembly method. FIG. 3A shows snap rings 20 and 22 in loaded positions in the inventive apparatus. Upper snap ring 20 is held in place by virtue of driver 106 being magnetic or including a separate magnet 106*m*. (Magnet 106*m* is illustrated only in FIG. 3A). Lower snap ring 22 rests on driver 118 by gravity. Snap rings 20 and 22 are not fully circular and thus can be manually loaded through the narrow ends of tapered holes 112 and 123, respectively. FIG. 3B shows needle bearings 16 and 18 placed in position for automated assembly. Finally, FIG. 3C shows U-joint yoke 12 and trunnion body 14 manually positioned in apparatus 100. In such position, trunnions 24 and 26 and yoke arm openings 28 and 32 are all in alignment with needle bearings 16 and 18 and tapered holes 112 and 123. In this position, all of the components U-joint 10 are ready for automated assembly.

Figure 3D:
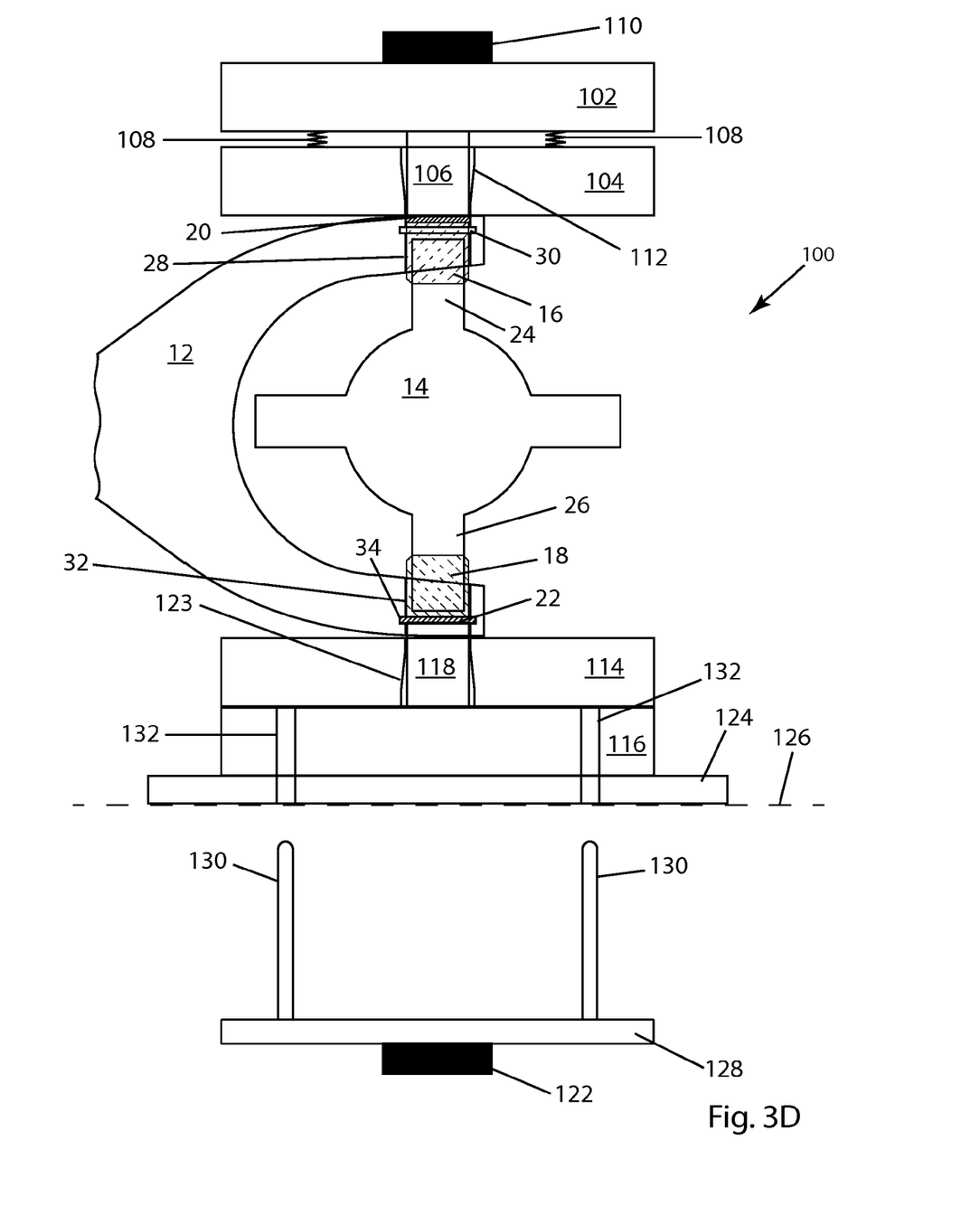
FIG. 3D is a cross-sectional schematic drawing illustrating the step of automatic lower snap ring insertion into its corresponding U-joint yoke arm using the method and apparatus of this invention.

FIG. 3D illustrates the result of movement provided by power source 110 driving upper driver 106 through upper driver plate 102 which in turn moves a number of elements of apparatus 100 and U-joint 10. Springs 108 are stiffer than springs 120; consequently, movement of the lower plate pair 114, 116 relative to one another is greater than movement of the upper plate pair 102, 104 relative to one another. This serves to drive lower snap ring 22 (via driver 118) along tapered hole 123, into opening 32 and into groove 34, as illustrated in FIGS. 2A-2D and described above. As a result, needle bearing 18, on trunnion 26, is positioned against lower snap ring 22.

Figure 3E:
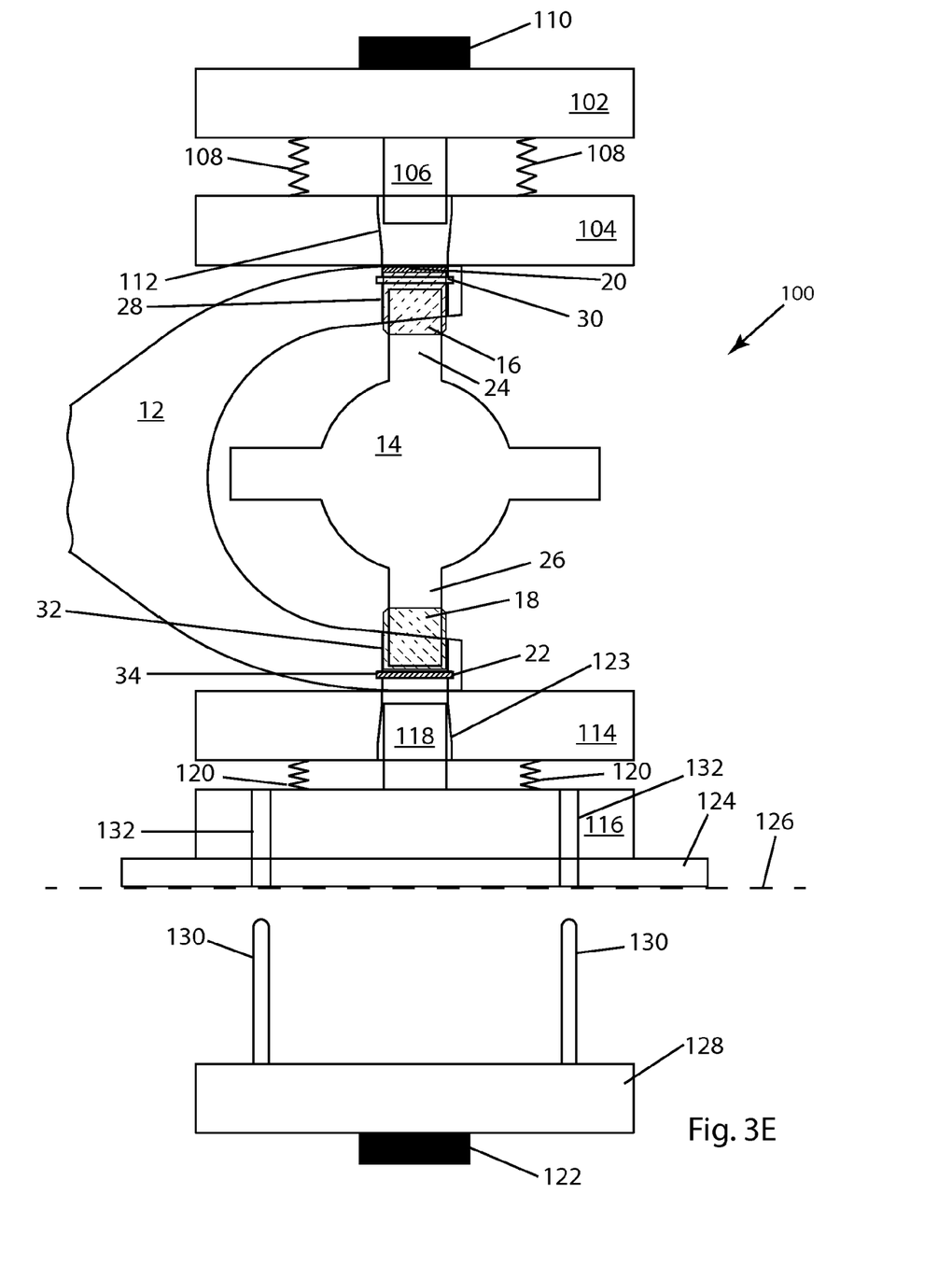
FIGS. 3E and 3F are cross-sectional schematic drawings illustrating the subsequent steps of automatic upper snap ring insertion into its corresponding U-joint yoke arm using the method and apparatus of this invention.

FIG. 3E illustrates the resulting positions of the components of apparatus 100 and U-joint 10 after upper driver 106 is partially backed away through the action of power source 110. Since springs 108 are stiffer than springs 120, the spacing between plates 102 and 104 is larger than the spacing between plates 114 and 116. Apparatus 100 is now ready for the final automatic assembly step as shown in FIG. 3F.

Figure 3F:
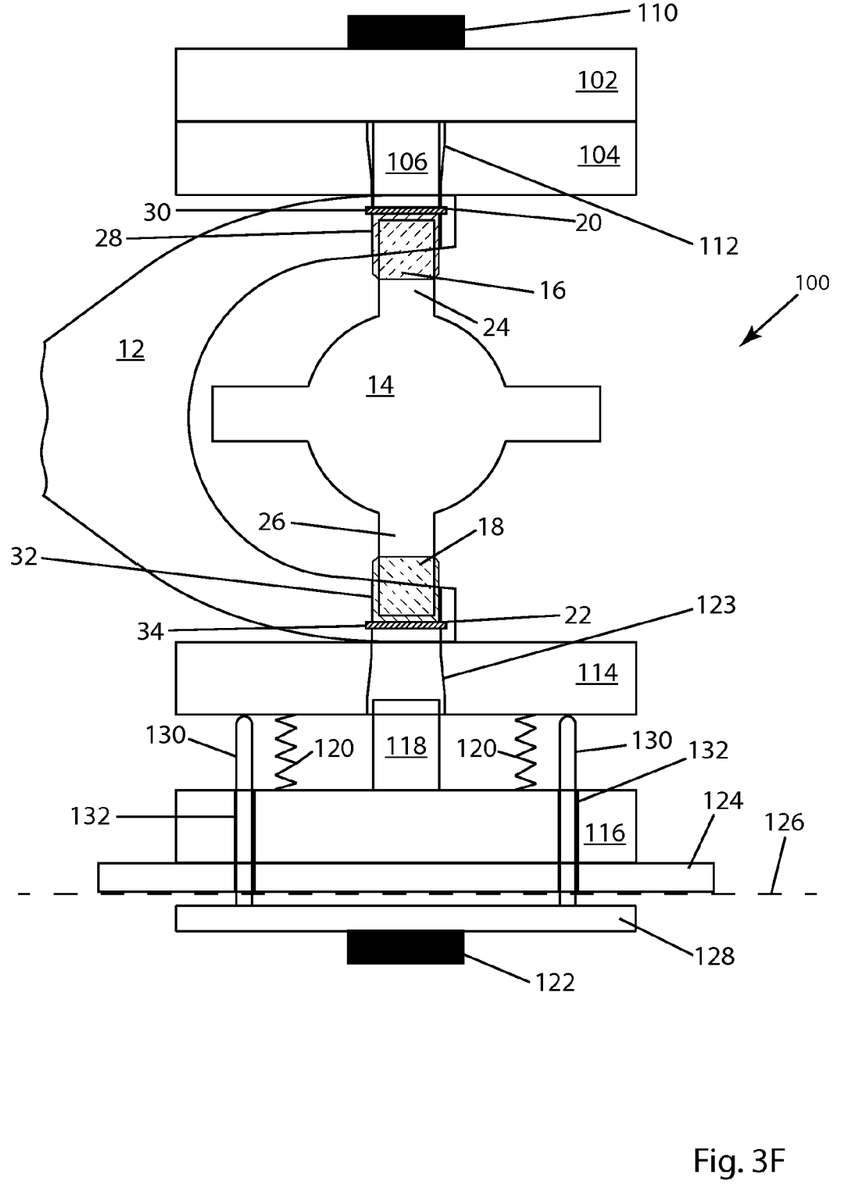

In the step illustrated in FIG. 3F, power source 122 provides linear movement of rod plate 128, thereby extending rods 130 through holes 132 to engage and raise lower tapered hole plate 114 which in turn raises yoke 12 and decreases the spacing between upper plates 102 and 104 until snap ring 20 seats in groove 30. At this point, power sources 110 and 122 provide linear movement to open apparatus 100 to permit removal of fully-assembled U-joint 10 and prepare apparatus 100 for subsequent manual loading and automatic assembly of additional U-joints.

The steps illustrated in FIGS. 3D-3F are fully-automatic, hands-free, timed movements which quickly, safely and repeatably assemble U-joints of the type shown in FIG. 1.

While the principles of this invention have been described in connection with specific embodiments, it should be understood clearly that these descriptions are made only by way of example and are not intended to limit the scope of the invention.

The invention claimed is:

1. Apparatus for automatic assembly of universal joints which include a yoke with snap ring grooves in yoke arms of the yoke, a trunnion body, bearings, and snap rings to secure the bearings in the yoke, the apparatus comprising:

an upper parallel plate pair, including an uppermost driver plate having an upper drive member, an upper tapered-hole plate defining a tapered hole axially aligned with the upper drive member and having a narrow end of the tapered hole positioned away from the upper driver plate, and at least one spring between the plates of the upper pair;

a lower parallel plate pair, including a lowermost driver plate having a lower drive member, a lower tapered-hole plate defining a tapered hole axially aligned with the upper and lower drive members and having a narrow end of the tapered hole positioned away from the lower driver plate, and at least one spring between the plates of the lower pair;

a base plate on which the lower driver plate is mounted and a movable rod plate therebelow having driver rods extending through corresponding holes in the lower driver plate;

upper and lower power sources configured to provide axial movement of the upper driver plate and the rod plate, respectively; and a programmed controller controlling the power sources.

2. The apparatus of claim 1 wherein the tapered holes have a taper of between 4° and 6°.

3. The apparatus of claim 2 wherein the spring(s) of the lower plate pair have a lower stiffness than the spring(s) of the upper plate pair.

4. The apparatus of claim 2 wherein the controller is a programmable logic controller.

5. The apparatus of claim 2 wherein at least one of the drive members is magnetic.

6. The apparatus of claim 5 wherein the magnetic drive member includes a magnet.

7. The apparatus of claim 1 wherein the spring(s) of the lower plate pair have a lower stiffness than the spring(s) of the upper plate pair.

8. The apparatus of claim 1 wherein the controller is a programmable logic controller.

9. The apparatus of claim 1 wherein at least one of the drive members is magnetic.

10. The apparatus of claim 9 wherein the magnetic drive member includes a magnet.

11. The apparatus of claim 1 wherein the spring(s) of the lower plate pair have a lower stiffness than the spring(s) of the upper plate pair.

12. The apparatus of claim 1 wherein the controller is a programmable logic controller.

13. A method for automatic assembly of universal joints which include a yoke with snap ring grooves in yoke arms of the yoke, a trunnion body, bearings, and snap rings to secure the bearings in the yoke, the steps comprising:

providing an upper parallel plate pair, including an uppermost driver plate having an upper drive member, an upper tapered-hole plate defining a tapered hole axially aligned with the upper drive member and having a narrow end of the tapered hole positioned away from the upper driver plate, and at least one spring between the plates of the upper pair;

providing a lower parallel plate pair, including a lowermost driver plate having a lower drive member, a lower tapered-hole plate defining a tapered hole axially aligned with the upper and lower drive members and having a narrow end of the tapered hole positioned away from the lower driver plate, and at least one spring between the plates of the lower pair, such spring(s) having a lower stiffness than the spring(s) of the upper plate pair;

providing a base plate on which the lower driver plate is mounted and a movable rod plate therebelow having driver rods extending through corresponding holes in the lower driver plate;

providing upper and lower power sources configured to provide axial movement of the upper driver plate and the rod plate, respectively;

providing a programmed controller controlling the power sources;

positioning the distal ends of the upper and lower drive members at wide ends of the upper and lower tapered holes, respectively;

placing one of the snap rings in each of the tapered holes and thereafter placing one of the bearings in each of the tapered holes;

placing the yoke and trunnion body such that trunnions of the trunnion body are in alignment with the tapered holes; and automatically sequencing movements of the upper driver plate and the rod plate to sequentially urge each of the snap rings through the corresponding narrowing tapered hole such that the snap ring moves into position for expansion into the corresponding snap ring groove.

* * * * *